United States Patent

[11] 3,590,847

| [72] | Inventor | Donald A. Worden<br>Pompton Plains, N.J. |
|---|---|---|
| [21] | Appl. No. | 703,651 |
| [22] | Filed | Feb. 7, 1968 |
| [45] | Patented | July 6, 1971 |
| [73] | Assignee | Marotta Valve Corporation<br>Boonton, N.J. |

[54] CONSTRUCTION FOR IN-LINE PRESSURE CONTROL VALVE
10 Claims, 3 Drawing Figs.

[52] U.S. Cl. .................................................. 137/116.5, 137/508
[51] Int. Cl. .................................................. G05d 11/00
[50] Field of Search ........................................ 137/115, 116.3, 116.5, 219, 220, 508; 251/625.6, 25

[56] References Cited
UNITED STATES PATENTS

| 1,752,439 | 4/1930 | Larner | 137/219 |
| 2,488,649 | 11/1949 | Teague | 137/508 |
| 2,804,881 | 9/1957 | Seid et al. | 137/508 X |
| 3,093,155 | 6/1963 | Dawes | 137/508 X |
| 3,159,433 | 12/1964 | Chevreux et al. | 137/116.5 X |

Primary Examiner—William F. O'Dea
Assistant Examiner—David J. Zobkiw
Attorney—Sandoe, Hopgood & Calimafde ABSTRACT: This specification discloses a flow control valve construction in which the valve element remains stationary and the seat moves. The seat is part of an annular piston or similar element which extends circumferentially around the valve element and which cooperates with the valve element to form a partition across the inside of the valve housing when the valve is closed. There is a recess in the inside wall of the piston which provides an offset in the fluid flow passage so that fluid can flow around the circumferential edge of the valve element when the seat moves away from the valve element to open the valve. The piston can be operated in response to a manual control or a pilot valve. The preferred construction is a pressure reducer with an integral relief valve. The construction provides a compact in-line valve having a diameter not substantially greater than the diameter of the fluid line for which the valve controls the flow.

PATENTED JUL 6 1971

3,590,847

INVENTOR
Donald A. Worden
BY
Sandoe, Hill,
Schottler & Widstrom
ATTORNEYS.

CONSTRUCTION FOR IN-LINE PRESSURE CONTROL VALVE

BACKGROUND AND SUMMARY OF THE INVENTION

It is an object of this invention to provide a valve for controlling the flow of fluid through a pipe with the valve confined in a housing that is in line with the pipe and not of substantially greater diameter than the pipe itself. The construction is suitable for pressure reducers or shutoff valves, the latter being directly or pilot controlled.

Another object is to provide an improved, in-line valve with a large cross section for flow when open and a resulting low-pressure drop. The invention has a minimum number of parts and is of rugged construction for high-reliability and minimum maintenance.

In the preferred construction, the invention has a housing with a fluid passage therethrough including an inlet portion and an outlet portion in alignment with one another and with the upstream and downstream sections of pipe between which the invention is located. A stationary poppet valve at the downstream end of the inlet portion of the passage contacts with a movable seat carried by an annular piston which surrounds the valve element. This piston has a recess in its inside wall which serves as an offset at the end of the inlet portion of the passage and as a bypass around the valve element when the valve is open.

The piston can be made responsive to pressure in a sensing chamber to which fluid is supplied from a pilot regulator or control valve. In one modification of the invention, there are two annular pistons responsive to pressure in different annular portions of a cylinder and this makes the opening and closing of the valve responsive to more than one control pressure.

Other objects, features and advantages of the invention will appear or be pointed out as the description proceeds.

Figure 1:
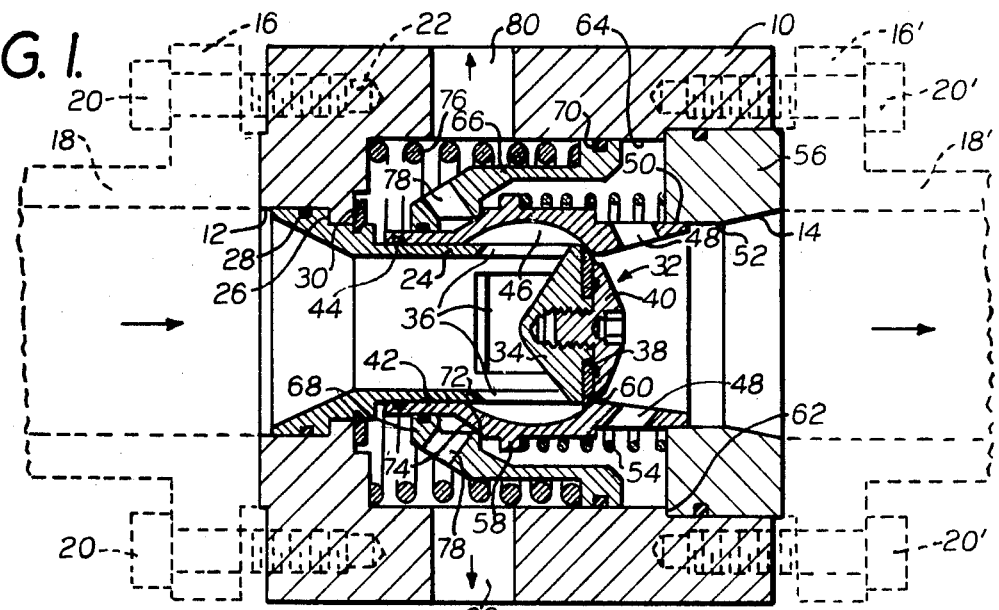
FIG. 1 is a sectional view showing a flow control valve made in accordance with this invention and located between two sections of pipe.

The flow control valve shown in FIG. 1 includes a housing 10 having a fluid passage therethrough including an inlet portion 12 and an outlet portion 14. The upstream end of the housing 10 is connected with a flange 16 of a length of piping 18, by a circle of screws 20 which extend through openings in the flange 16 and which thread into corresponding openings 22 in the upstream face of the housing 10. The other end of the housing is connected with a length of piping 18' by screws 20' extending through a flange 16', these parts corresponding to the parts at the upstream end of the housing and being designated by the same reference characters with a prime appended.

Within the housing 10 there is a sleeve 24 which forms a continuation of the inlet portion 12 of the fluid passage and this sleeve 24 seats against a shoulder 26 of a counterbore in the housing 10 with a suitable sealing ring 28 for preventing flow of fluid around the outside of the sleeve 24. The sleeve is locked in position against the shoulder 26 by a snap ring 30.

A valve element 32 is rigidly connected with the downstream end of the sleeve 24. This valve element includes a deflector 34 facing upstream in the sleeve 24 and forming a partition to close the end of the sleeve 24. The deflector 34 can be of one-piece construction with the sleeve 24 but is preferably attached to the end of the sleeve beyond openings 36 which extend through the sides of the sleeve 24 just ahead of the deflector 34. A washer 38 of seat material is secured to the back of the deflector 34 by a screw 40 having a large head which extends radially over most of the area of the washer 38 and which threads into an opening in the back of the deflector 34.

A piston 42 surrounds the sleeve 24 and also surrounds the valve element 32. This piston 42 slides on the outside surface of the sleeve 24 as a bearing and it has a sealing ring 44 for preventing escape of fluid through the running clearance between the sleeve 24 and the piston 42. The piston 42 has a circumferential recess 46 in its inner surface at the region of the sleeve openings 36. The purpose of this recess will be explained in connection with FIG. 2. Beyond the recess 46, the piston 42 has angularly spaced radial openings 48 and it has an outer surface 50 which slides in a cylindrical wall portion 52 of the fluid outlet portion 14 of the fluid passage through the housing.

A helical coil spring 54 compressed between an end ring 56 of the housing 10 and a shoulder 58 urges the piston 42 to move toward the left in FIG. 1 and into contact with the valve element 32. The portion of the recess 46 which curves inward into position to contact with the valve element 32 forms the seat of the valve and this seat is indicated in FIG. 1 by the reference character 60. The purpose of the recess 46 is evident from FIG. 2 where the piston 42 has moved toward the right from the position occupied in FIG. 1. This change in position brings the widest part of the recess 46 into a position radially outward from the circumference of the valve element 32 and thus provides an annular passage around the circumferential edge of the valve element 32. The recess 46 is preferably proportioned so that the cross section of the annular recess, when the valve is in its widest open position, is substantially equal to the cross section of the inlet passage through the sleeve 24.

The openings 36 provide an offset in the fluid passage through the housing 10 and the recess 46 provides a further portion of the offset in the fluid passage for bypassing the fluid around the valve element 32.

Referring again to FIG. 1, the ring 56 is held in place and clamped against a shoulder 62 of the housing by the screws 20' which hold the housing 20 in assembled relation with the flange 16' and the end face of the downstream part of the pipe 18'. The ring 56 closes an end of a chamber 64 in which the piston 42 is contained. This chamber 64 also contains a second piston 66 which will be referred to as the "second" or "annular" piston though actually both of the pistons 42 and 66 are annular. However, for designation purposes the outer piston 66 will be referred to as the "annular" piston.

The annular piston 66 has a portion 68 which slides on the outside of the first piston 42 as a bearing; both bearing surfaces being cylindrical. The annular piston 66 has another portion 70 which slides on a cylindrical wall of the chamber 64 as a guide bearing. There are sealing rings for both the inside and outside surfaces of the annular piston 66.

The purpose of the annular piston 66 is to provide the valve with a vent against excess pressure. The annular piston 66 has a circular edge 72 which serves as a valve surface; and this circular edge 72 contacts with a sloping face 74 on the outside of the first piston 42, the face 74 providing the valve seat for the circular edge 72. Thus the annular piston 66 is a relief valve which is closed when it is in contact with the seat surface 74 and which opens when the annular piston 66 moves to the left in FIGS. 1 and 2 against the force of a spring 76 which loads the relief valve to hold it closed in normal operation. There are radially extending vent passages 78 opening through the annular piston 66 at angularly spaced locations around the circumference of the annular piston 66.

The portion of the chamber 64 between the first piston 42 and the annular piston 66, which portion contains the spring 54, is always in communication with the outlet portion 14 of the fluid passage through the valve housing. If the pressure in the outlet portion 14 ever rises high enough to overcome the force of the spring 76, this pressure forces the annular piston 66 to move toward the left in FIGS. 1 and 2 so that the circular edge 72 of the annular piston 66 moves away from its seat 74 and opens up a clearance between the pistons 42 and 66 for the escape of excess pressure. There are vent openings 80 through the housing 10 communicating with the portion of the chamber 64 which is outside of the annular piston 66 and into which the excess pressure escapes through the vent passages 78.

When the annular piston 66 is seated against the sloping surface 74 of the first piston 42, the spring 76 which loads the annular piston also loads the piston 42. The spring 76 is a stronger spring than the spring 54 and thus the spring 76 moves the piston 42 toward the open position shown in FIG. 2. When sufficient fluid flows past the stationary valve element 32 to increase the fluid pressure in the outlet portion 14 to a predetermined value, then this fluid pressure acting on the piston 42 toward the left in FIGS. 1 and 2 opposes the force of the spring 76 with sufficient pressure to move the piston 42 and the annular piston 66 into the positions shown in FIG. 1. This brings the valve seat 60 into contact with the stationary valve 32 and shuts off the front flow of fluid to the outlet portion 14 of the fluid passage.

As the pressure in the outlet portion 14 decreases, the force acting against the piston 42 to oppose the spring 76 decreases and this permits the spring 76 to open the valve sufficiently to permit some flow of fluid from the high-pressure inlet portion 12 to the reduced pressure outlet portion 14 of the fluid passage. Thus the construction shown in FIGS. 1 and 2 serve as a pressure regulator for receiving fluid at high and variable pressure from the inlet portion 12 and for delivering it at a reduced and substantially constant pressure to the outlet portion 14 of the fluid passage.

Figure 2:
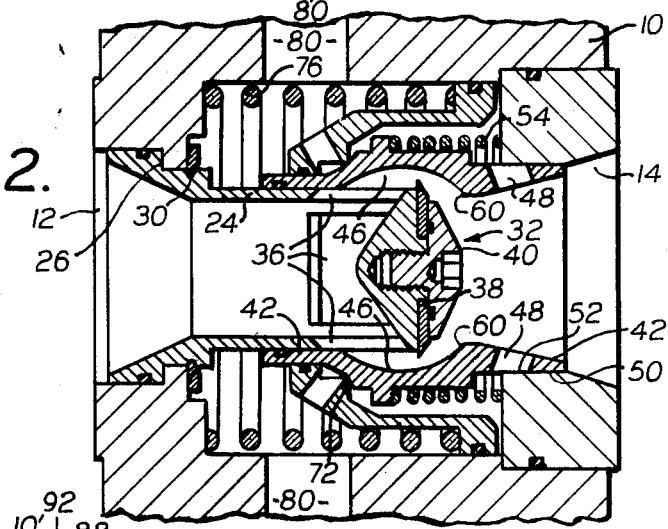
FIG. 2 is a view of the flow control valve shown in FIG. 1 with the valve in open position.
Figure 3:
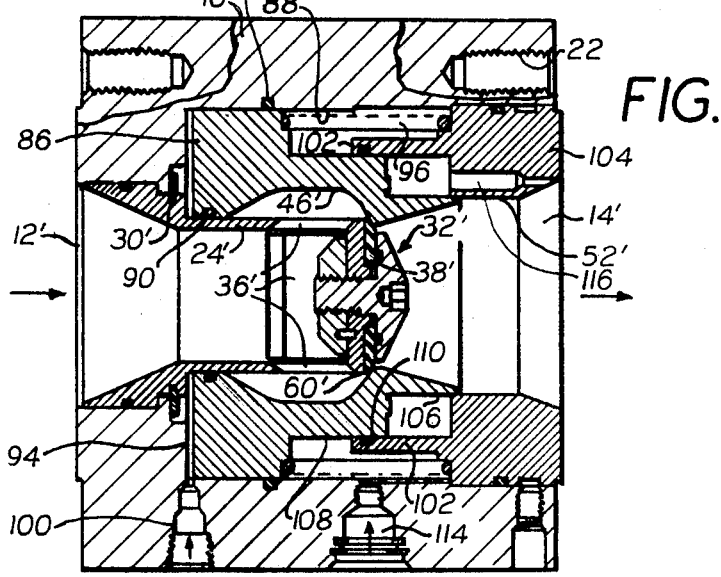
FIG. 3 is a view similar to FIG. 2 but showing a modified form of the invention and showing the valve closed.

FIG. 3 shows a modified form of the invention. Parts corresponding to those of FIGS. 1 and 2 are indicated by the same reference character with a prime appended. For example the housing 10' has a passage with an inlet portion 12' and an outlet portion 14'. It has a sleeve 24' with radial passages 36' providing an offset in the inlet passage. The end of the sleeve 24' is closed by a stationary valve element 32' which is of slightly different mechanical construction from that shown in FIGS. 1 and 2 but which is the same in operation.

There is only one piston in the housing 10' however, and this piston, indicated by the reference character 86 slides on the cylindrical outside surface of the sleeve 24' as a bearing guide and slides on a cylindrical guide surface 52' of the outlet portion 14'. The piston 86 also has a circumferential recess 46' and a seat surface 60' similar to that described in connection with FIGS. 1 and 2.

The piston 86 differs from the construction shown in FIGS. 1 and 2 in that it extends radially all the way to a cylindrical inside wall 88 of the housing 10'. The piston 86 has an inside sealing ring 90 and an outside sealing ring 92. There is a loading chamber 94 in the housing 10' at the left hand end of the piston 86. A helical compression spring 96 urges the piston 86 toward the left in FIG. 3 against the fluid pressure in the loading or sensing chamber 94. Fluid is supplied to this chamber 94 through a port 100 opening through the side of the housing 10.

There is a circular ridge 102 extending from an end wall 104 of the housing 10'. This circular ridge 102 is coaxial with the sleeve 24' and with the cylindrical bearing surface 52' of the outlet portion 14' of the fluid passage through the housing 10'.

The piston 86 has three different outside diameters. It has a part 106 with a diameter equal to the diameter of the guide bearing 52'. It has another part 108 with a diameter providing a running clearance in the cylinder formed by the circular ridge 102. There is a sealing ring 110 for sealing the clearance between the piston 86 and the cylindrical wall formed by the inside surface of the ridge 102. The piston 86 also has a part which has the full diameter of the cylindrical surface 88 and which has its running clearances sealed by the sealing ring 92.

Fluid can be admitted into the housing 10' through a port 114 in position to react against the right hand shoulder of the piston 86 where the diameter increases from that of the part 108 to the full diameter of the cylindrical surface 88. Fluid can be admitted through another port 116, from the outlet portion 14' into the cylinder formed by the inside surface of the circular ridge 102.

When the apparatus shown in FIG. 3 is used as a pressure reducer, the port 114 can be left open to the atmosphere and the piston 86 can be moved by the unbalancing of pressure in the sensing chamber 94 and the pressure within the cylinder formed by the outside surface of the port 106 and the surface of circular ridge 102 combined with the pressure of the spring 96.

The construction shown in FIG. 3 can be operated in numerous other ways, however, by connecting the ports 100 and 114 with remote controlled pressure forces having manual means for admitting working fluid into the spaces of the housing 10', or by connecting one or more of the ports with a pilot regulator. In the preferred construction of all of the modifications, the diameter of the seat area which contacts with the stationary valve 32 or 32' is preferably equal to the outside diameter of the sleeve 24 or 24' on which the piston 42 or 86, respectively, slides. Thus the high-pressure side of the valve is balanced.

The preferred embodiments of the invention have been illustrated and described, but changes and modifications can be made and some features can be used in different combinations without departing from the invention as defined in the claims.

What I claim is:

1. An in-line flow control valve including a housing enclosing a chamber having a passage for fluid extending therethrough, said passage including an inlet portion and an outlet portion in alignment with said inlet portion, a poppet valve element at the downstream end of the inlet portion, an offset in the passage upstream of the valve element and through which fluid flows outward and past the periphery of the valve element on its way to the aligned outlet portion of the fluid passage, a piston circumferentially surrounding the valve element and the offset of the passage, a valve seat carried by the piston in position to contact with the poppet valve element, when in contact with one another, forming a partition across the chamber for preventing flow of fluid from the inlet portion to the outlet portion of the passage, a recess in the piston adjacent to the offset and constituting part of the fluid passage through the housing and in position for flow of fluid around the valve element when the valve seat moves away from the valve element, a bearing element in the chamber along which the piston slides axially, connecting means joining the valve element and said bearing element, the offset in the passage extending through the connecting means, the piston being movable in response to the fluid pressure in the housing.

2. The in-line flow control valve described in claim 1 characterized by the connecting means including a sleeve extending into the chamber and through which the inlet portion of the passage extends, the valve element being connected to the downstream end of the sleeve, and the offset in the passage including openings through the side of the sleeve, a second bearing along which the piston slides, one of said bearings being the outside surface of the sleeve.

3. The in-line flow control valve described in claim 2 characterized by the outlet portion of the passage being beyond the downstream end of the sleeve and in axial alignment therewith, the piston extending part way into the outlet portion of the passage, and the other of the bearings along which the piston slides being the wall of said outlet portion of the passage.

4. The in-line flow control valve described in claim 1 characterized by means for moving the piston including a part of the chamber on the upstream side of the piston, and a pilot pressure supply port opening into said part of the chamber.

5. The in-line flow control valve described in claim 1 characterized by the valve being a pressure regulator for receiving fluid at high and variable pressure and for delivering it at a reduced and substantially constant pressure, the piston on its downstream side being exposed to the pressure in the outlet portion of the passage, and means for loading the upstream side of the piston.

6. The in-line flow control valve described in claim 5 characterized by a section of the chamber to which the upstream side of the piston is exposed and in which the loading pressure is applied to the piston, and spring means urging the valve seat into position to shut off flow of fluid.

7. The in-line flow control valve described in claim 5 characterized by an annular piston that surrounds the first mentioned piston and that serves as a valve seat for a relief valve element surface formed on the outside of the first mentioned piston, the said annular piston being exposed on one side to the pressure in the outlet portion of the passage, a bearing in the chamber along which said annular piston moves axially, and said means for loading the upstream side of the piston being applied to said annular piston opposite to the pressure in the outlet portion of the passage, the first mentioned piston and said annular piston moving in opposite directions to shift their valve seats into open position.

8. The in-line flow control valve described in claim 1 characterized by the piston having cylindrical portions of different diameters along different parts of its length, tow bearings in the chamber along which the piston slides axially, each of said two bearings being a cylinder in which the different diameter parts of the piston fit, and means for subjecting the different diameter parts of the piston to different fluid pressures.

9. The in-line flow control valve described in claim 8 characterized by one of the different diameter parts of the piston being exposed to the pressure of fluid in the outlet portion of the passage, means for sealing the portion of the chamber to which another different diameter part of the piston is exposed so as to provide a loading chamber, a fluid supply passage through which fluid for loading the piston is admitted into the loading chamber, and means for exerting force on the piston to move it against the pressure in the loading chamber.

10. The in-line flow control valve described in claim 9 characterized by the chamber enclosed by the housing being cylindrical and being the cylinder in which the larger diameter part of the different parts of the piston slides, and said means for exerting force on the piston including a part of the cylinder enclosed by the housing at the downstream end of the piston, and including also a passage for pilot pressure fluid opening into the chamber at said downstream end of the piston.